(12) United States Patent
Slusarz et al.

(10) Patent No.: US 11,187,088 B2
(45) Date of Patent: Nov. 30, 2021

(54) TURBOMACHINE VANE, INCLUDING DEFLECTORS IN AN INNER COOLING CAVITY

(71) Applicant: SAFRAN AIRCRAFT ENGINES, Paris (FR)

(72) Inventors: Michel Slusarz, Moissy-Cramayel (FR); Patrice Eneau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/819,420

(22) Filed: Mar. 16, 2020

(65) Prior Publication Data
US 2020/0300098 A1  Sep. 24, 2020

(30) Foreign Application Priority Data
Mar. 21, 2019  (FR) ...................................... 19 02947

(51) Int. Cl.
*F01D 5/18* (2006.01)
*B33Y 80/00* (2015.01)

(52) U.S. Cl.
CPC .............. *F01D 5/187* (2013.01); *B33Y 80/00* (2014.12); *F05D 2230/21* (2013.01); *F05D 2240/126* (2013.01); *F05D 2260/22141* (2013.01)

(58) Field of Classification Search
CPC .............. F01D 5/187; F05D 2240/126; F05D 2260/22141
See application file for complete search history.

(56) References Cited

U.S. PATENT DOCUMENTS

| 4,514,144 A * | 4/1985 | Lee | ........................ B22C 9/04 416/96 R |
| 7,094,031 B2 * | 8/2006 | Lee | ........................ F01D 5/187 416/97 R |
| 7,785,070 B2 * | 8/2010 | Liang | ...................... F01D 5/187 416/97 R |
| 9,695,696 B2 * | 7/2017 | Jones | ........................ F01D 5/16 |

(Continued)

FOREIGN PATENT DOCUMENTS

| FR | 2 165 499 A5 | 8/1973 | |
| GB | 1410014 A * | 10/1975 | ............ F01D 5/187 |
| WO | WO 2019/005425 A1 | 1/2019 | |

OTHER PUBLICATIONS

French Preliminary Search Report dated Dec. 19, 2019 in French Application 19 02947 filed on Mar. 21, 2019 (with English Translation of Categories of Cited Documents), 2 pages.

*Primary Examiner* — Eldon T Brockman
(74) *Attorney, Agent, or Firm* — Oblon, McClelland, Maier & Neustadt, L.L.P.

(57) ABSTRACT

A turbine vane including at least one inner cavity including a plurality of deflectors which are carried by an inner face of the lower surface wall and by an inner face of the upper surface wall, wherein each deflector extends mainly in a transverse direction from the inner face of the lower surface wall or from the inner face of the upper surface wall, in the direction of the other one of the lower surface wall or the upper surface wall, and wherein the length of each deflector in the transverse direction is greater than half the transverse distance between the inner face of the lower surface wall and the inner face of the upper surface wall, on either side of the deflector.

9 Claims, 7 Drawing Sheets

(56) References Cited

U.S. PATENT DOCUMENTS

| | | | |
|---|---|---|---|
| 9,968,991 B2* | 5/2018 | Arnett | B22C 7/00 |
| 10,196,906 B2* | 2/2019 | Lee | F01D 5/187 |
| 2006/0051208 A1* | 3/2006 | Lee | F01D 5/187 |
| | | | 416/97 R |
| 2009/0068022 A1* | 3/2009 | Liang | F01D 5/187 |
| | | | 416/97 R |
| 2015/0037165 A1* | 2/2015 | Jones | F01D 5/187 |
| | | | 416/232 |
| 2017/0152748 A1 | 6/2017 | Kasperski et al. | |
| 2017/0173667 A1* | 6/2017 | Arnett | F04D 29/542 |
| 2018/0038232 A1* | 2/2018 | Lee | F01D 5/187 |

\* cited by examiner

TURBOMACHINE VANE, INCLUDING DEFLECTORS IN AN INNER COOLING CAVITY

TECHNICAL FIELD

The invention relates to a turbomachine vane, in particular a movable gas turbine vane including an inner cooling cavity.

The invention relates more particularly to a vane including means for improving the heat exchanges between the walls of the vane and a cooling air flow circulating through the vane.

PRIOR ART

The vanes of a turbomachine gas turbine, such as the movable vanes of the high pressure turbine for example, are subjected to the high temperatures of the gases coming from the combustion chamber of the turbomachine.

These temperatures are high enough to cause irreversible damage to the vanes, which has the consequence of limiting their lifespan.

In order to limit the heating of these vanes, it is known to produce in the vanes a cooling circuit comprising one or more cavities wherein a cooling fluid such as air circulates.

Air is generally introduced through the root of the vane, it passes through each cavity in an optimised path and is then ejected through orifices formed in the walls of the vane.

The purpose of optimising the cooling circuit is to increase the heat exchanges between the cooling air and the walls of the vane.

Thus, a lesser amount of cooling air will be required to cool it. Relatively fresh cooling air is conveyed to the vane root, circulates in internal cavities of the vane to ensure the cooling thereof, then the cooling air is discharged from the vane into the overall gas flow, it has an influence on the overall performance of the turbomachine.

Also, improving the cooling of the vane allows it to be used in a flow path subjected to gases having a higher temperature, consequently allowing an increase in the thrust produced by the turbomachine.

Improving the cooling of the vane finally allows increasing the lifespan of the vane, for the same flow rate and temperature conditions in the flow path/

Thus, by increasing the heat exchanges between the air flow and the walls of the vane, it is possible to improve the efficiency of the turbomachine.

Among the means allowing to promote heat exchanges, it has been proposed to form deflectors in an inner cavity. These deflectors produce disturbances in the flowing of air, thus promoting heat exchanges.

The purpose of the invention is to propose a vane design allowing to further improve the heat exchanges by the use of deflectors.

DESCRIPTION OF THE INVENTION

The invention proposes a turbine vane, which is intended to be disposed around an axis of the turbine, extending radially relative to said turbine axis and including at a first radially inner end a root, at a second radially outer end a top and a blade extending radially between the root and the top which is delimited by an axially upstream leading edge, an axially downstream trailing edge, a lower surface wall and an upper surface wall which connect the leading edge and the trailing edge to each other and at least one inner cavity extending between the root and the top, a fluid intake opening in the cavity located at a radially inner end of the cavity and at least one outlet opening of said fluid which opens out of the vane, the cavity including a plurality of deflectors which are carried by an inner face of the lower surface wall and by an inner face of the upper surface wall, characterised in that each deflector extends mainly in a transverse direction from the inner face of the lower surface wall or from the inner face of the upper surface wall, in the direction of the other one of the lower surface wall or the upper surface wall, and in that the length of each deflector in the transverse direction is greater than half the transverse distance between the inner face of the lower surface wall and the inner face of the upper surface wall, on either side of the deflector.

Such a transverse length of the deflectors allows deflecting the circulating air flow so that it is no longer only oriented along the main axis of the vane but also so that it is sinuous between the lower surface and upper surface walls which are subjected to the highest temperatures and need to be cooled.

Preferably, each deflector extends between an upstream axial end wall and a downstream axial end wall of the cavity.

Preferably, each deflector is connected to the upstream axial end wall and to the downstream axial end wall of the cavity.

Preferably, the deflectors are inclined relative to the transverse direction.

Preferably, the deflectors are inclined relative to the transverse direction and the deflectors carried by the lower surface wall are inclined relative to the deflectors carried by the upper surface wall.

Preferably, each deflector which is carried by one of the lower surface wall or the upper surface wall is located radially between two deflectors which are carried by the other of the lower surface wall or the upper surface wall.

Preferably, the cavity includes several segments of radial main orientation, which are axially offset relative to each other and which each extend between the root and the top of the vane forming a serpentine which axially extends between the leading edge and the trailing edge, and said deflectors are formed in at least one segment of the cavity.

Preferably, said segment is a segment wherein the fluid is intended to flow in a direction from the top to the root of the vane.

The invention also relates to a method for manufacturing a vane according to the invention, which includes a step of producing a core corresponding to said at least one cavity of the vane, the core including recesses intended for the formation of deflectors, the method further including a step of placing the core in a mould and a step of moulding the vane, characterised in that the step of producing the core is a step by additive manufacturing.

The invention also relates to a turbomachine including a gas turbine characterised in that it includes a plurality of vanes according to the invention.

DETAILED DESCRIPTION OF THE INVENTION

Figure 1:
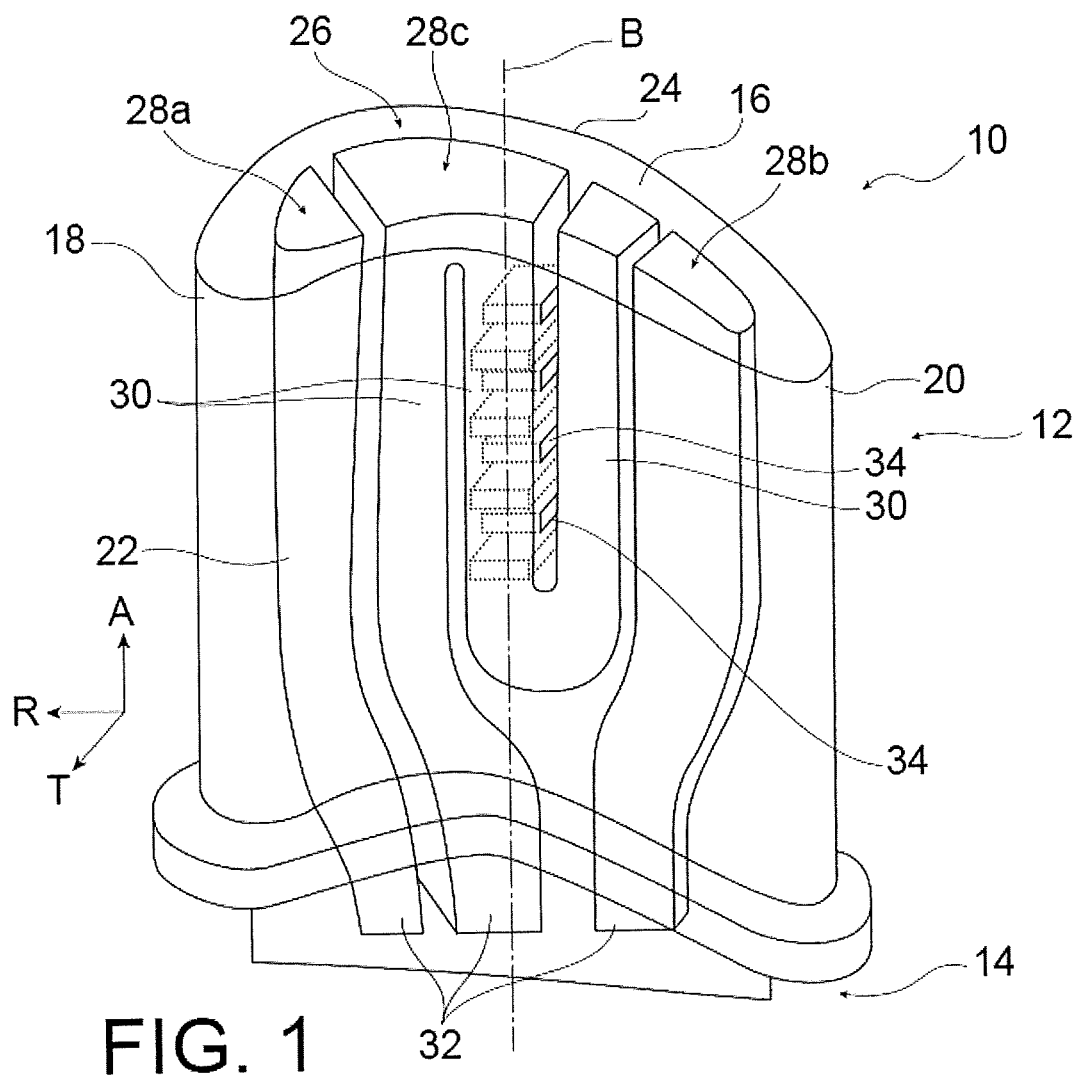
FIG. 1 is a schematic representation of a turbine vane including cooling cavities.

FIG. 1 shows a movable vane 10 of a turbomachine, such as a movable vane of a high pressure turbine.

It will be understood that the invention is not limited to this single movable vane and that it can also be applied to a stationary vane of a turbomachine turbine.

The vane 10 includes an aerodynamic portion 12, called a blade, which extends along a main axis B of the vane 10 between a root 14 and a top 16.

When the vane is mounted in the turbomachine, its main axis B is oriented mainly radially relative to the main axis of the turbine and therefore the main axis of the turbomachine, with the blade 12 extending through a gas circulation flow path.

In the description which follows, the axial, radial and transverse orientations will be used according to the reference frame ART shown in the figures, for which the axial direction is the direction of the main axis of the turbomachine, the radial direction is the direction of the main axis B of the vane 10, which is radial relative to the main axis of the turbomachine and the transverse direction is the direction perpendicular to the axial and radial directions.

The root 14 is then located at the radially inner end of the vane 10, it is intended for the connection of the vane 10 with a high pressure turbine disc of the turbomachine. Its design being known, it will not be described in more detail.

The top 16 is located at the radially outer end of the vane 10, it is intended to be disposed in the proximity of an annular wall delimiting the gas circulation flow path.

The blade 12 is shaped to be immersed in the gas flow coming from the combustion chamber.

It includes a leading edge 18 located at a first axial end of the vane 10, a trailing edge 20 located at a second opposite axial end of the vane 10, a lower surface wall 22 and an upper surface wall 24 each extending between the leading edge 18 and the trailing edge 20, which transversely delimit the blade 12.

The vane 10 is also provided with an inner cooling circuit 26 intended to cool the vane 10 relative to the high heat of the gases coming from the combustion chamber of the turbomachine and wherein the vane 14 is intended to be bathed.

The cooling circuit 26 comprises at least one cavity 28 extending in the blade 12 in the direction of the main axis B of the vane 10.

Here, according to the embodiment shown in FIG. 1, the cooling circuit 26 includes three cavities 28 distributed in the axial direction, namely a leading edge cavity 28a disposed on the side of the leading edge 18, a trailing edge cavity 28b disposed on the side of the trailing edge 20 and a central cavity 28c located axially between the leading edge cavity 28a and the trailing edge cavity 28b.

The leading edge cavity 28a and the trailing edge cavity 28b are both of a main elongated shape having a radial orientation, that is to say an orientation substantially parallel to the main axis B.

The central cavity 28 is of sinuous shape, it consists of three consecutive segments 30, each of which is oriented radially, that is to say each of which is substantially parallel to the main axis B and which are aligned.

The central segment 30 is joined at its radially outer end, which is close to the top 16, to the end of the segment 30 located on the side of the leading edge 18 and at its radially inner end, which is close to the root 14 to an end of the segment 30 located on the side of the trailing edge 20.

Thus, the central cavity 28 has a bend at each junction between two adjacent segments 30.

Each cavity 28 includes an air intake opening 32 located at a radially inner end of the vane 10, here at the root 14 through which an air flow intended to cool the vane 10 is introduced into the cooling system.

Furthermore, here, only the segment 30 of the central cavity 28 which is located closer to the leading edge 18 than the other segments 30, includes an air intake opening 32.

Each cavity 28 includes orifices (not shown) allowing the cooling air to exit from the vane 10, into the gas flow path. These orifices open in particular into the lower surface 22 and the upper surface 24 walls.

Each cavity 28 is delimited transversely by the lower surface wall 22 and the upper surface wall 24.

Thus, during its circulation through each cavity 28, the cooling air exchanges heat with the lower surface wall 22 and the upper surface wall 24 to cool them.

In order to promote heat exchanges between the cooling air and the lower surface wall 22 and the upper surface wall 24, at least one cavity 28, and preferably each cavity 28 includes a plurality of air deflectors 34.

Each deflector 34 is carried by the inner face 22i of the lower surface wall 22 or by the inner face 24i of the upper surface wall 24 and it protrudes in the transverse direction inside the cavity 28 in the direction of the other wall 22, 24 and it is parallel to the axial direction.

The axial dimension of each deflector 34 is substantially equal to the axial dimension of the cavity 28, that is to say that each deflector extends over substantially the entire axial dimension of the cavity.

Preferably, each deflector 34 extends axially over the entire axial dimension of the cavity 28, it is thus connected to both upstream and downstream axial end walls of the cavity 28.

Furthermore, the deflectors 34 are disposed alternately on the lower surface wall 22 and on the upper surface wall 24 in the radial direction of the cavity 28, that is to say a deflector 34 carried by the inner face 22i of the lower surface wall 22 is located radially between two deflectors 34 which are carried by the inner face 24i of the upper surface wall 24 and a deflector 34 carried by the inner face 24i of the upper surface wall 24 is located radially between two deflectors 34 which are carried by the inner face 22i of the lower surface wall 22.

Figure 4:
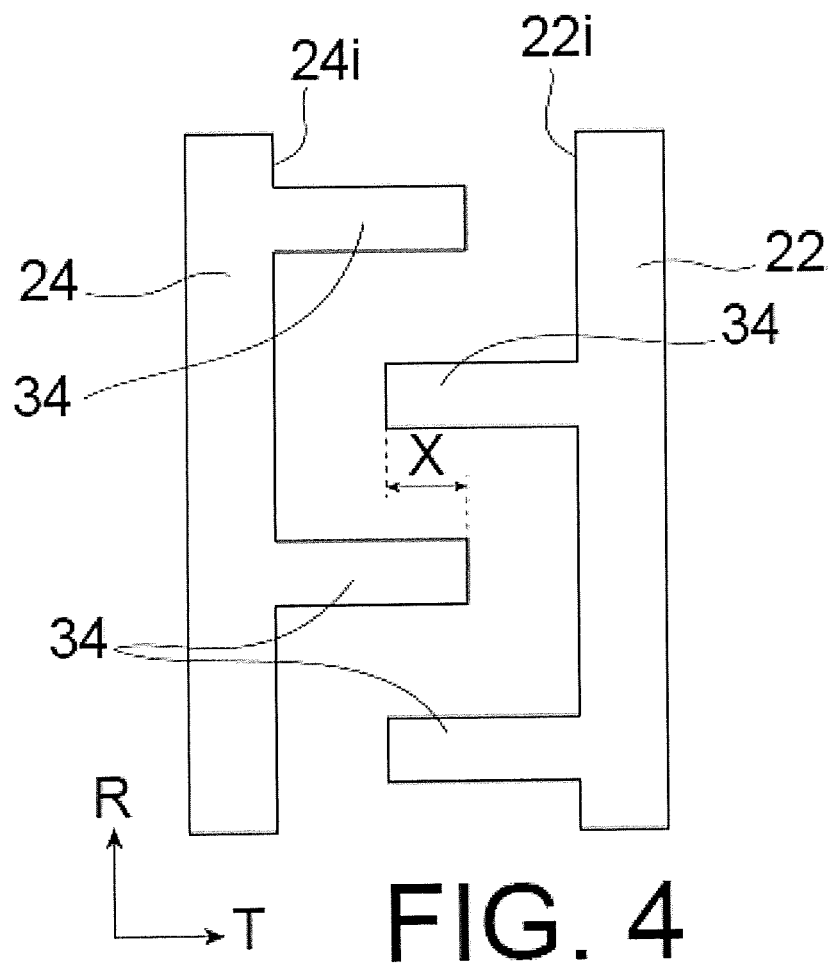
FIG. 4 is a schematic representation on a larger scale of a detail of FIG. 3 showing the preferred geometry of the deflectors.

As can be seen in more detail in FIG. 4, the transverse dimension of each deflector 34 is greater than half the distance between the inner face 22i of the lower surface wall 22 and the inner face 24i of the upper surface wall 24.

Thus, the free transverse ends of the deflectors 34 overlap transversely.

This implies that the conduit thus formed in the cavity 28 and wherein the cooling air flows is not only oriented in the direction of the main axis B but it also winds transversely in the cavity 28.

This forces the air flow to travel a longer path than the axial length of the cavity 28 and therefore this increases the heat exchanges between the air flow and the lower surface 22 and upper surface 24 walls.

Furthermore, and more particularly in relation with the second segment 30 of the central cavity 28, thanks to the transverse dimension of the deflectors 34, the air flow travels its sinusoidal trajectory in this segment, even when it circulates in the opposite direction to the direction of circulation in the other segments 30.

Indeed, in accordance with the prior art for which the deflectors are shorter than half the distance between the lower surface wall and the upper surface wall, these deflectors only produce disturbances in the flowing of air. Thus, when the turbomachine is in operation, the Coriolis effect which is exerted on the air flow and which is produced by the rotation of the vane, tends, in this intermediate segment of the cavity, to press the air on a single wall of the vane 10, limiting heat exchanges.

Thanks to the length of the deflectors 34 according to the invention, which is greater than half the distance between the lower surface wall 22 and the upper surface wall 24, the air flow is forced to circulate along the inner face 22i, 24i of the lower surface wall 22 and the upper surface wall 24.

Furthermore, the deflectors 34 form fins for exchanging heat with the cooling air, which allows further increasing the heat exchanges between the cooling air and the lower surface and upper surface walls.

According to a first embodiment shown in FIG. 4, each deflector 34 is also perpendicular to the main radial direction of the cavity 28, that is to say that it extends in a transverse axial plane.

Figure 5:
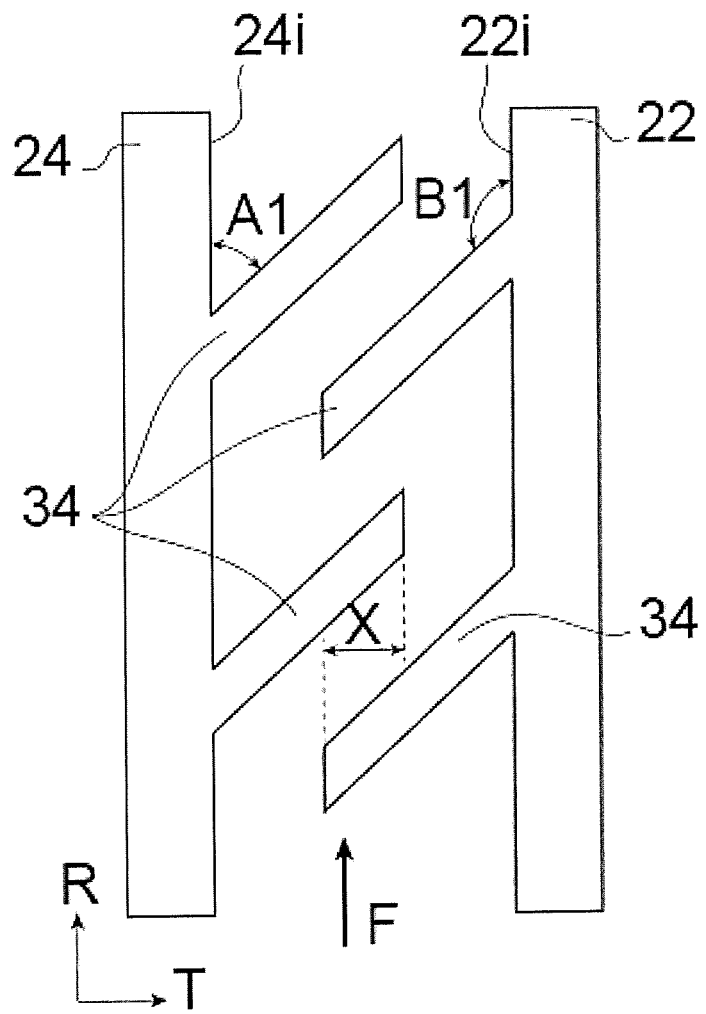
FIG. 5 is a view similar to that of FIG. 4, wherein the deflectors are inclined relative to the main direction of the vane in a first direction.
Figure 6:
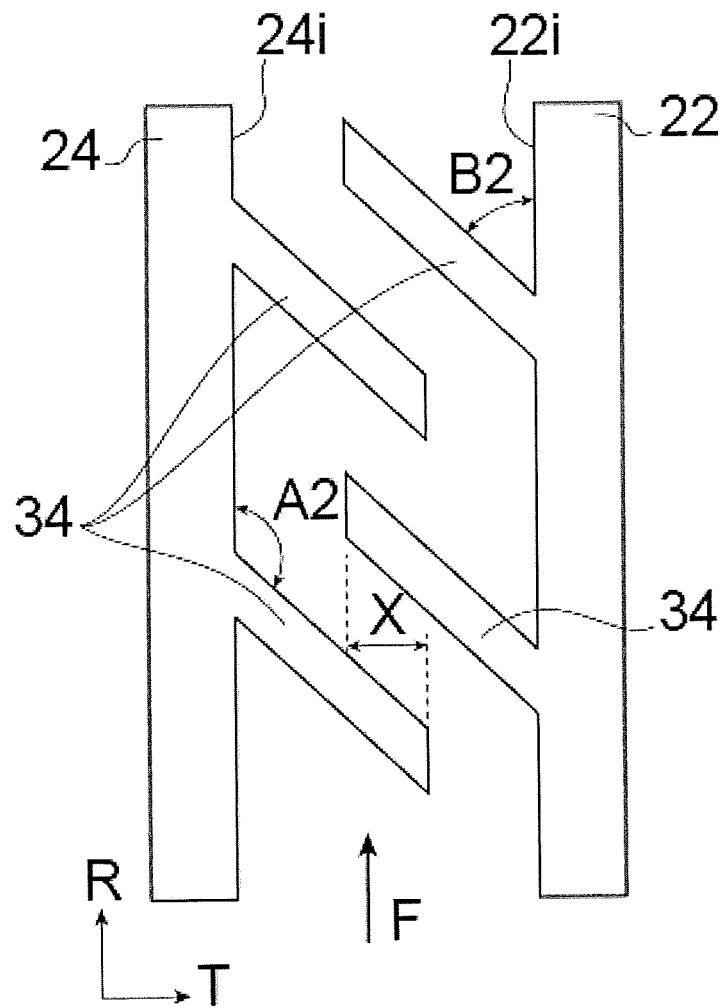
FIG. 6 is a view similar to that of FIG. 4, wherein the deflectors are inclined relative to the main direction of the vane in a second direction.
Figure 7:
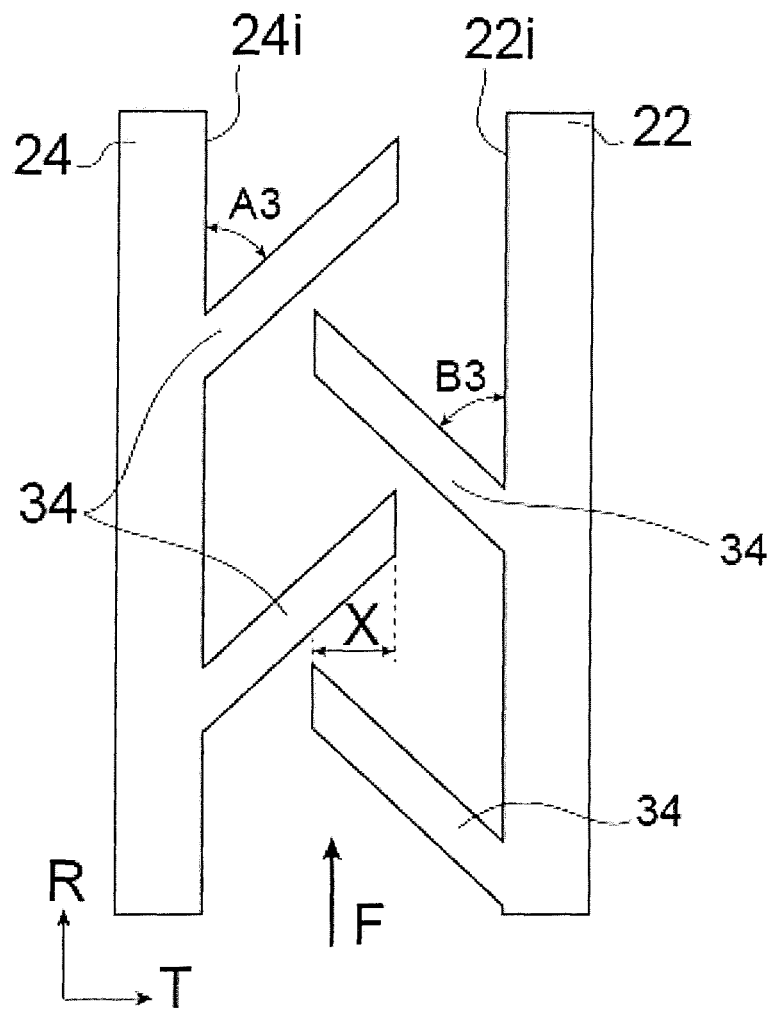
FIG. 7 is a view similar to that of FIG. 4, wherein the deflectors are alternately inclined relative to the main direction of the vane in two opposite directions.

According to a second embodiment shown in FIGS. 5 to 7, each deflector 34 is inclined relative to the transverse direction.

As shown in FIG. 5, the deflectors 34 all have the same first inclination relative to the transverse direction, so that they are parallel to each other.

Here, the deflectors 34 carried by the upper surface wall 24 are inclined in the flowing direction of the cooling air flow in the cavity 28 and the deflectors 34 carried by the lower surface wall 22 are inclined in a direction opposite to the flowing direction of the cooling air flow in the cavity.

The angle A1 formed between the inner face 24i of the upper surface wall 24 and a downstream wall of each deflector 34 which is carried by the upper surface wall 24, in the flowing direction of air in the cavity 28 is acute, the angle B1 formed between the inner face 22i of the lower surface wall 22 and a downstream wall of each deflector 34 which is carried by the lower surface wall 22 is obtuse and is additional to the angle A1.

As shown in FIG. 6, the deflectors 34 all have the same second inclination relative to the transverse direction, so that they are parallel to each other.

Here, the deflectors 34 carried by the upper surface wall 24 are inclined in the opposite direction to the flowing direction of the cooling air flow in the cavity 28 and the deflectors 34 carried by the lower surface wall 22 are inclined in the flowing direction of the cooling air flow in the cavity.

The angle A2 formed between the inner face 24i of the upper surface wall 24 and a downstream wall of each deflector 34 which is carried by the upper surface wall 24, in the flowing direction of air in the cavity 28 is obtuse, the angle B2 formed between the inner face 22i of the lower surface wall 22 and a downstream wall of each deflector 34 which is carried by the lower surface wall 22 is acute and is additional to the angle A2.

As shown in FIG. 7, the deflectors 34 are inclined relative to the transverse direction in the flowing direction F of the air flow in the cavity 28.

This embodiment increases the route travelled by the cooling air flow in the cavity 28, and therefore further increases the heat exchange.

The deflectors 34 carried by the lower surface wall 22 are consequently inclined relative to the deflectors 34 carried by the upper surface wall 24.

The angle A3 formed between the inner face 24i of the upper surface wall 24 and a downstream wall of each deflector 34 which is carried by the upper surface wall 24, in the flowing direction of air in the cavity 28 is acute, the angle B3 formed between the inner face 22i of the lower surface wall 22 and a downstream wall of each deflector 34 which is carried by the lower surface wall 22 is also acute and is preferably equal to the angle A3.

The deflectors 34 then form, in cross-section along a transverse radial plane, a pattern called herringbone pattern.

Figure 2:
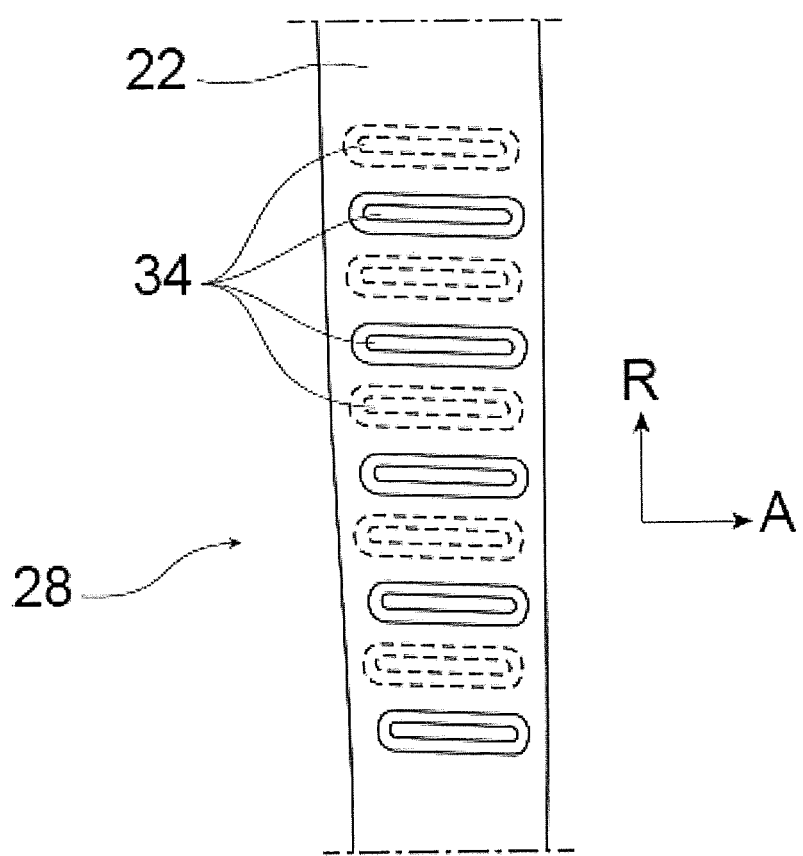
FIG. 2 is a detail of a cavity segment showing the presence of deflectors in the cavity.
Figure 3:
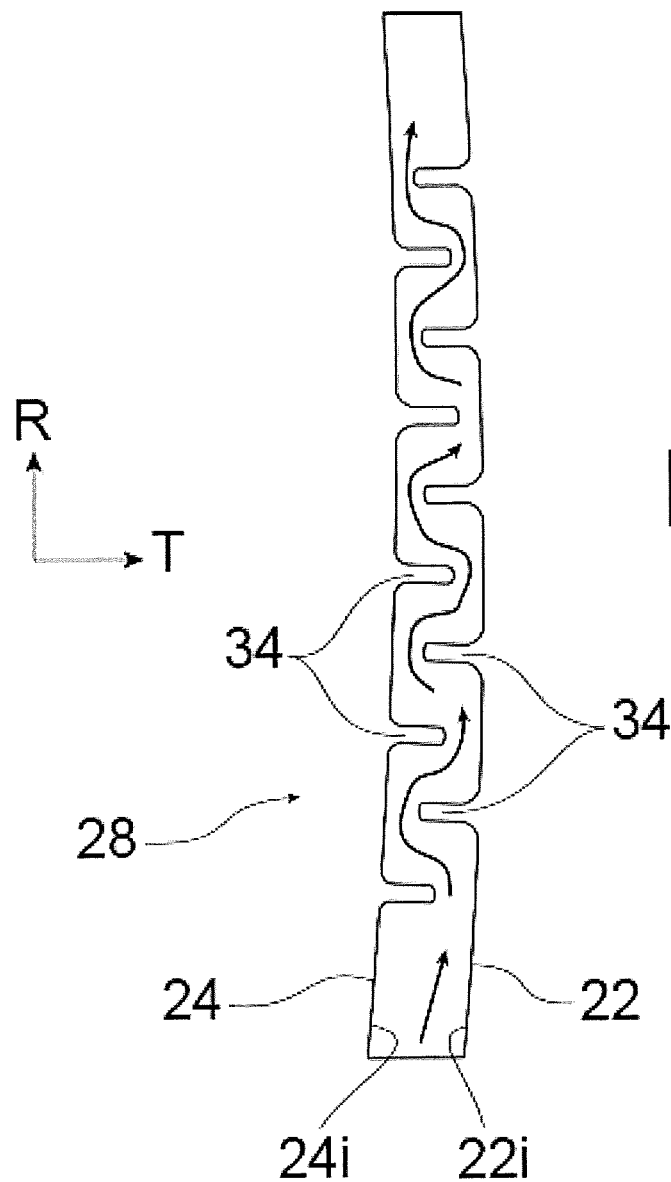
FIG. 3 is a section of the segment shown in FIG. 2 along an axial plane showing the effect of the deflectors on the flowing of air.

Furthermore, as can be seen in FIG. 2, each deflector 34 extends in a plane parallel to the axial direction.

It will be understood that the invention is not limited to this embodiment and that each deflector 34 can extend in a plane which is inclined relative to the axial direction, in one direction or the other.

To produce the vane 10, a moulding method is implemented, with the use of cores to form the cavities 28.

According to a preferred embodiment of this method, each core is produced by an additive manufacturing step.

This step allows forming complex parts, which is in particular the case for a core intended for make the cavities 28 because the recesses intended to form the deflectors 34 extend beyond the parting line of the core.

The invention claimed is:

1. A turbine vane to be disposed around an axis of the turbine, extending radially relative to said turbine axis and comprising at a first radially inner end a root, at a second radially outer end, a top and a blade extending radially between the root and the top delimited by an axially upstream leading edge, an axially downstream trailing edge, a lower surface wall and an upper surface wall which connect the leading edge and the trailing edge to each other and at least one inner cavity extending between the root and the top, a fluid intake opening in the cavity located at a radially inner end of the cavity and at least one outlet opening of said fluid which opens out of the vane, the cavity including a plurality of deflectors which are carried by an inner face of the lower surface wall and by an inner face of the upper surface wall, wherein each deflector extends mainly in a transverse direction from the inner face of the lower surface wall or from the inner face of the upper surface wall, in the direction of the other one of the lower surface wall or the upper surface wall, and wherein the length of each deflector in the transverse direction is greater than half the transverse distance between the inner face of the lower surface wall and the inner face of the upper surface wall, on either side of the deflector, wherein the deflectors are inclined relative to the transverse direction in a flowing direction of an air flow in said cavity.

2. The vane according to claim 1, wherein each deflector extends between an upstream axial end wall and a downstream axial end wall of the cavity.

3. The vane according to claim 2, wherein each deflector is connected to the upstream axial end wall and to the downstream axial end wall of the cavity.

4. The vane according to claim 2, wherein the deflectors are inclined relative to the transverse direction and the deflectors carried by the lower surface wall are inclined relative to the deflectors carried by the upper surface wall.

5. The vane according to claim 1, wherein each deflector which is carried by one of the lower surface wall or the upper surface wall is located radially between two deflectors which are carried by the other of the lower surface wall or the upper surface wall.

6. The vane according to claim 1, wherein the cavity includes several segments of radial main orientation, which are axially offset relative to each other and which each extend between the root and the top of the vane forming a serpentine which axially extends between the leading edge and the trailing edge,
wherein said deflectors are formed in at least one segment of the cavity.

7. The vane according to claim 6, wherein said segment is a segment wherein the fluid is intended to flow in a direction from the top to the root of the vane.

8. A method for manufacturing a vane according to claim 1, which includes a step of producing a core corresponding to said at least one cavity of the vane, the core including recesses intended for the formation of the deflectors,
the method further comprising a step of placing the core in a mould and a step of moulding the vane,
wherein the step of producing the core is a step by additive manufacturing.

9. A turbomachine comprising a gas turbine comprising a plurality of vanes according to claim 1.

* * * * *